INVENTORS
HENRY BALL &
DONALD N. McLAUGHLIN

BY Edward J. Norton
Attorney

INVENTORS
HENRY BALL &
DONALD N. McLAUGHLIN
BY Edward J. Norton
Attorney

INVENTORS
HENRY BALL &
DONALD N. McLAUGHLIN
BY Edward J. Norton
Attorney

United States Patent Office 3,441,342
Patented Apr. 29, 1969

3,441,342

FREQUENCY AND PHASE ERROR DETECTION MEANS FOR SYNCHRONIZATION SYSTEMS

Henry Ball, Burbank, and Donald N. McLaughlin, Los Angeles, Calif., assignors to Radio Corporation of America, a corporation of Delaware Filed Mar. 29, 1965, Ser. No. 443,232
Int. Cl. G03b *31/00;* H03k *9/06;* H03d *3/00*
U.S. Cl. 352—17 12 Claims

ABSTRACT OF THE DISCLOSURE

A frequency and phase error detection system for synchronizing the operation of devices having periodic characteristics. A first set of pulse trains of a phase and frequency corresponding to that of the signals derived from the devices to be synchronized are examined for coincidence in a digital pulse resolver. In the absence of coincidence a second set of pulse trains are generated which contain the frequency and/or phase error information of the input signals. The errors are digitally detected and separated by a differential sensing circuit which provides an output useable to minimize the phase and frequency differences.

This invention relates to improvements in control systems and particularly to devices for controlling the synchronization of two recording and reproducing systems.

It is frequently desirable to control the operation of systems having periodic characteristics. This is especially true in the recording and reproducing arts where different characteristics of events are recorded by diffeent systems. For example, in the motion picture art it is desirable to record the sound which accompanies the motion picture on a magnetic tape. When the picture and sound are later reproduced, it is necessary to control the speed and position of the two reproducing systems to obtain precise synchronization between the sound and picture.

One technique which has been used in the recording art to synchronize the operation of two recording and reproducing systems is to record a reference signal on the recording medium of one recording system where the frequency of the reference signal corresponds to the speed of the other recording medium during the recording process. For example, a reference signal whose frequency is related to the speed of a motion picture camera may be recorded on a track on the magnetic tape which records the sound. When the picture and sound are later reproduced, the speed of the motion picture projector can be controlled by the reference signal recorded on the tape. This technique provides control of the speed of the film so that the film and magnetic tape will be driven at the same relative speed during reproduction as they were during recording. However, such a technique will not compensate for errors in the position of the two recording mediums during playback. Errors in relative position between the two mediums may be expressed as phase errors and may be introduced for example when the motor driving the tape takes a different time to come up to normal speed than the motor driving the film. After normal speeds are obtained, the synchronization system described above will ensure proper frequency or speed synchronization between the two recording mediums but there may nevertheless be a phase or position error between the picture and the sound.

It is therefore an object of the present invention to provide a novel system for controlling the operation of systems having periodic characteristics.

It is a further object of the present invention to provide a novel system for ensuring precise synchronization between systems having periodic characteristics.

A further object of the present invention is to provide a novel system for ensuring precise synchronization between the picture and sound recordings in a motion picture reproducing system.

A further object of the present invention is to provide a novel circuit for measuring errors in the synchronization between two systems having periodic characteristics.

A further object of the present invention is to provide a novel circuit for measuring phase and frequency errors.

Briefly, the present invention makes use of a reference signal whose frequency and phase characteristics correspond to the desired frequency and phase or speed and position characteristics of a system to be controlled. Where the invention is employed to synchronize the operation of two recording and reproducing systems, the reference signal derived from the characteristics of that one of the recording systems to be controlled during reproduction is recorded during the recording operation on the storage medium of the other recording system.

Upon reproduction, both the reproduced reference signal and a second signal from the recording system to be controlled are converted to pulse trains having phase and frequency characteristics corresponding to the characteristics of the reference signal and the second signal. The second signal is one which corresponds in its frequency and phase information to the speed and position of the recording system to be controlled during the reproducing part of its operation. Phase and frequency differences between the two pulse trains are detected by a novel digital detecting circuit constructed according to the present invention. The detecting circuit provides digital error signals indicating phase and frequency errors. The error signals are stored and converted to an analogue signal which is used to synchronize the operation of the controlled recording system with that of the other recording system.

In one embodiment of the present invention, the digital detecting circuitry includes a first circuit which will be called a pulse resolver and a second circuit which will be called a differential sensing circuit. In the embodiment discussed above, the pulse resolver receives the reproduced reference pulse train and the pulse train representing the actual characteristics during its reproducing operation of the controlled recording system and determines if there is any coincidence or near coincidence between the pulses of the two trains. If the pulses of the two trains do not occur in coincidence or near coincidence then the pulse resolver generates two output pulse trains having frequency and phase characteristics corresponding respectively to the two input pulse trains. If, however, the pulses of the input trains do occur in coincidence or near coincidence, i.e. if the pulses of one input pulse train overlap in time pulses of the second pulse train, then no output signals are generated by the pulse resolver.

The output signals from the pulse resolver are supplied to the differential sensing circuit which develops three output signals, two of which provide frequency error information and the third of which provides phase error information. Frequency errors are detected in the differential sensing circuit by detecting the occurrence of two or more pulses in a first input pulse train prior to the occurrence of one pulse in the second input pulse train. If two or more pulses occur in the first input pulse train prior to the occurrence of one pulse in the second pulse train, then all the pulses in the first pulse train with the exception of the first pulse pass through the differential sensing circuit and form one of the two frequency error indicating output signals. If two or more pulses occur in the second pulse train prior to one pulse occurring in the first pulse train, then all the pulses after the first in the second pulse train form the second of the two frequency error indicating output signals.

Phase errors are measured in the differential sensing circuit by measuring the time between pulses occurring alternately in the two input pulse trains. The third output signal from the differential sensing circuit indicates the phase error.

A more detailed description of the present invention will now be given with reference to the accompanying drawing in which.

In the description of the following embodiment, the invention is described with respect to its use in synchronizing the operation of two signal recording-reproducing systems. More generally, however, the invention may be employed to control the periodic characteristics of one system or to synchronize the operation of a plurality of systems having periodic characteristics.

Figure 1:
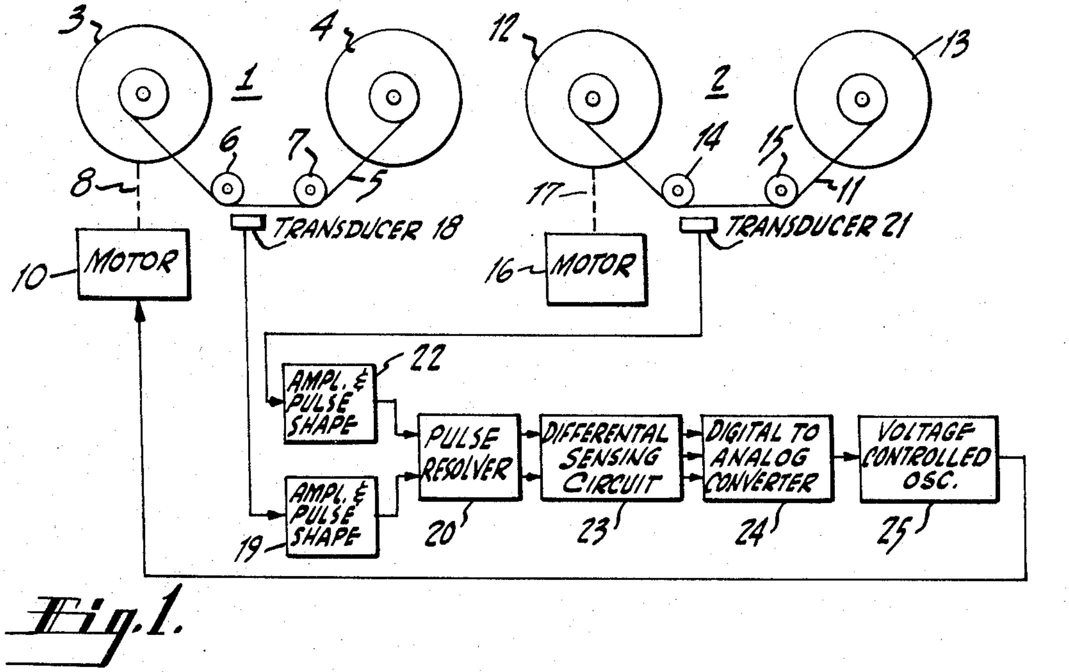
FIG. 1 is a block diagram of one embodiment of the present invention.

Referring to FIG. 1, two reproducing systems 1 and 2 are shown. The reproducing systems illustrated are intended to be completely general in that either may take the form of any particular type of recording system. By way of example, the first system 1 may be a motion picture projection system while the second system 2 may be a sound reproducing system of the magnetic tape type. The first reproducing system 1 includes two reels 3 and 4 and a record medium 5 which is driven between the two reels 3 and 4. Two guides 6 and 7 guide the recording medium 5 between the two reels 3 and 4. One reel 3 of the first reproducing system 1 is driven by a motor 10 through a mechanical linkage 8. The motor 10 is a conventional synchronous motor the speed of which corresponds to the frequency of the voltage supplied to the motor. The second reproducing system 2 is similar in construction to the first system 1. The second system 2 includes a record medium 11 driven between two reels 12 and 13. Two guides 14 and 15 guide the motion of the medium 11. One reel 12 is driven by a motor 16 through a mechanical linkage 17. The motor 16 may also be a conventional synchronous motor.

There is no requirement that the particular type of driving system illustrated be used. More practically, the record mediums 5 and 11 of the two systems 1 and 2 can be driven by a means external to either of the reels included in the respective systems. For example, it is common to drive motion picture film by a sprocket wheel or a combination of sprocket wheels driven by a motor. It is also common to drive a magnetic type with a capstan type drive.

Each of the two reproducing systems 1 and 2 will include apparatus to reproduce the recorded information other than control information. For the sake of clarity, however, such apparatus which can be conventional in all particulars is not shown in the drawing.

A transducer 18 is positioned adjacent the recording medium 5 of the first reproducing system 1. The transducer 18 picks up a signal whose frequency is related to the speed and position of the medium 5. Where the first reproducing system 1 is a motion picture projection system the transducer 18 may, for example, be an optical transducer which detects the presence of sprocket holes in the motion picture film. Or where the reproducing system 1 is a magnetic tape system the transducer 18 may be an electro-magnetic pick-up which detects a reference signal recorded on the magnetic tape. Such transducers are well-known to the recording arts. The signal picked up by the transducer 18 is fed to the input of an amplifier and pulse shaper circuit 19 which amplifies the signal picked up by the transducer 18 and converts it to a train of pulses of corresponding frequency and phase. The amplifier and pulse shaper circuit 19 may for example comprise a conventional transistor amplifier and a Schmitt trigger circuit. The output of the amplifier and pulse shaper circuit 19 is connected to one input of a pulse resolver circuit 20 which will be described more fully below with reference to FIG. 2.

A reference signal on the recording medium 11 is detected by the transducer 21. The particular form of the transducer 21 will depend on the particular type of recording system as pointed out with respect to transducer 18 above. The reference signal from the transducer 21 is fed to a second amplifier and pulse shaper circuit 22 which is essentially identical in construction to the first amplifier and pulse shaper circuit 19. The output pulses from the amplifier and pulse shaper circuit 22 are supplied to a second input of the pulse resolver 20.

The pulse resolver circuit 20 produces two output pulse trains which are applied to the differential sensing circuit 23. The construction of the differential sensing circuit 23 will be described more fully below with reference to FIG. 2. The differential sensing circuit 23 produces three output signals which are fed to a digital-to-analogue converter 24. A suitable embodiment for the digital-to-analogue converter 24 will be described in detail below with reference to FIGS. 4 through 6. The analogue output voltage of the digital-to-analogue converter 24 is fed to a voltage controlled oscillator 25. The voltage controlled oscillator 25 is of conventional construction. The output frequency of the voltage controlled oscillator 25 is proportional to the magnitude of the D.C. voltage supplied from the digital-to-analogue converter 24. The output of the voltage controlled oscillator 25 is fed to the synchronous motor 10 to control its speed.

In the operation of the embodiment of the invention shown in FIG. 1, synchronism is obtained between the operation of the two reproducing systems 1 and 2. The operation will be described by considering the first reproducing system 1 a motion picture projector and the second reproducing system 2 a magnetic tape recorder which reproduces the sound to accompany the motion picture. Therefore, the recording medium 5 of the first reproducing system 1 is a motion picture film and the transducer 18 is of the electro-optical type which detects the presence of sprocket holes in the film 5. The transducer 21 is an electromagnetic pickup which detects a reference signal recorded on the tape 11. The reference signal recorded on the tape 11 has frequency and phase characteristics corresponding to the speed and position characteristics of the motion picture camera during the original recording of the picture. Recording of the reference signal may be accomplished in any suitable manner. For example, the motor driving the motion picture camera may be a synchronous motor, the speed of which is proportional to the frequency of the voltage supplied to the motor. In this case the signal voltage applied to the synchronous motor used to drive the camera may be recorded as a reference signal along a narrow track on the magnetic recording medium 11 which also records the sound. The recording of the reference signal with the sound on the single magnetic tape enables accurate synchronization between film and tape during reproduction. During reproduction the speed and position characteristics of the motion picture projector are controlled to correspond to the characteristics of the reference signal recorded on the tape. Since the physical and therefore relative time relationship between the sound signal and reference signal are fixed, both signals being recorded on the same tape, the motion picture projector will operate with the same speed and position characteristics relative to the speed and position characteristics of the tape as did the camera during recording.

The signals from the transducers 18 and 21 are converted to pulse trains of corresponding frequency and phase by the two amplifier and pulse shaper circuits 19 and 22 respectively. The two pulse trains are applied to the pulse resolver circuit 20 which detects coincidence or near coincidence between the pulses supplied to it. If there is a coincidence or near coincidence between two input pulses, i.e. if a portion of a pulse from the amplifier and pulse shaper circuit 19 occurs during the time when a portion of a pulse from the amplifier and pulse shaper circuit 22 occurs, then there will be no output from the pulse resolver circuit 20. If however there is no coincidence between two input pulses then the pulse resolver circuit 20 generates two output pulses, one on each output line, whose frequency and phase characteristics correspond to those of the two pulses applied to the pulse resolver circuit 20.

The pulse trains from the output of the pulse resolver circuit 20 are applied to the differential sensing circuit 23. The differential sensing circuit 23 produces three output signals two of which represent frequency errors and one of which represents phase errors.

Frequency errors are detected in the differential sensing circuit 23 by detecting the occurrence of two or more pulses on one input pulse train prior to the occurrence of one pulse on the other input pulse train. If there is a frequency difference between the two pulse trains supplied to the pulse resolver circuit 20 then, because the pulse resolver 20, in effect, removes any pulses which occur in coincidence, the frequency difference will periodically cause two or more pulses to occur on one input to the differential sensing circuit 23 prior to the occurrence of one pulse on the other input to the differential sensing circuit 23. When such a condition is detected by the differential sensing circuit 23, the pulses in excess of one which so occur appear at one of the two frequency error indicating outputs of the differential sensing circuit 23. The particular one of the two outputs at which the pulses occur depends upon which pulse train is of the greater frequency. This operation of the differential sensing circuit 23 will be described in greater detail below with reference to FIG. 2.

Phase differences between the two pulse trains appearing at the inputs of the differential sensing circuit 23 are detected by measuring the period between pulses on alternate inputs. The third output of the differential sensing circuit 23 indicates phase errors.

The error signals from the output of the differential sensing circuit 23 are applied to the digital-to-analogue converter 24 which converts these error signals to an analogue voltage. Thus, the output of the digital-to-analogue converter 24 is a voltage which represents the phase and frequency errors in the signals from the two transducers 18 and 21. This voltage is applied to the voltage controlled oscillator 25 to control the frequency of the signal generated by the oscillator 25. The voltage controlled oscillator 25 is used to control the synchronous drive motor 10 of the motion picture projection system 1. Since both phase and frequency errors are detected by the differential sensing circuit 23 the speed of the motor 10 will be controlled to correct such errors.

Figure 2:
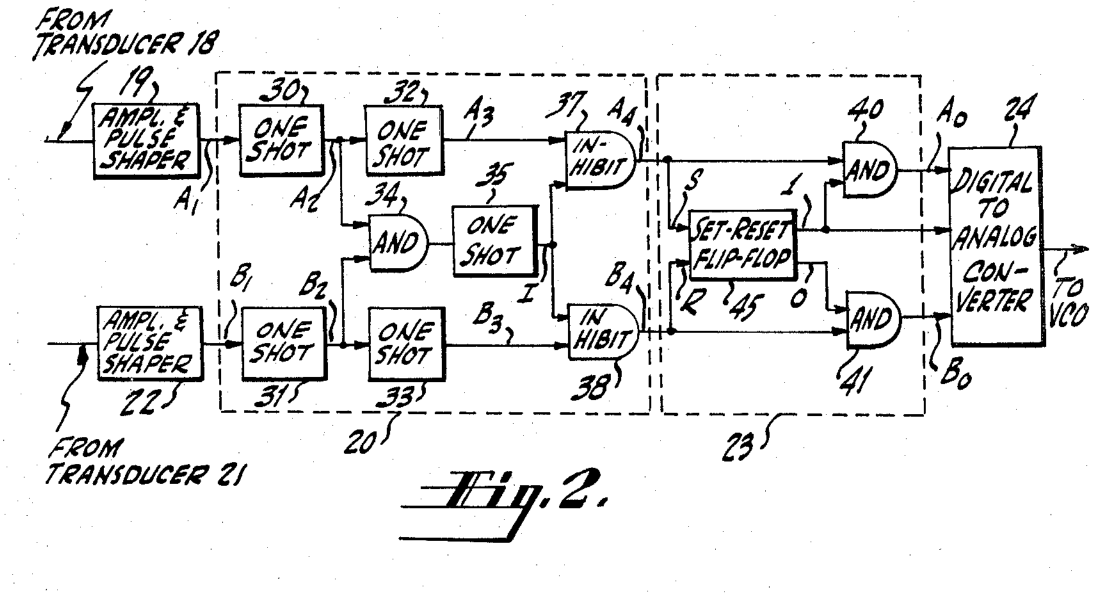
FIG. 2 is a circuit diagram of some of the elements of the embodiment of FIG. 1.
Figure 3:
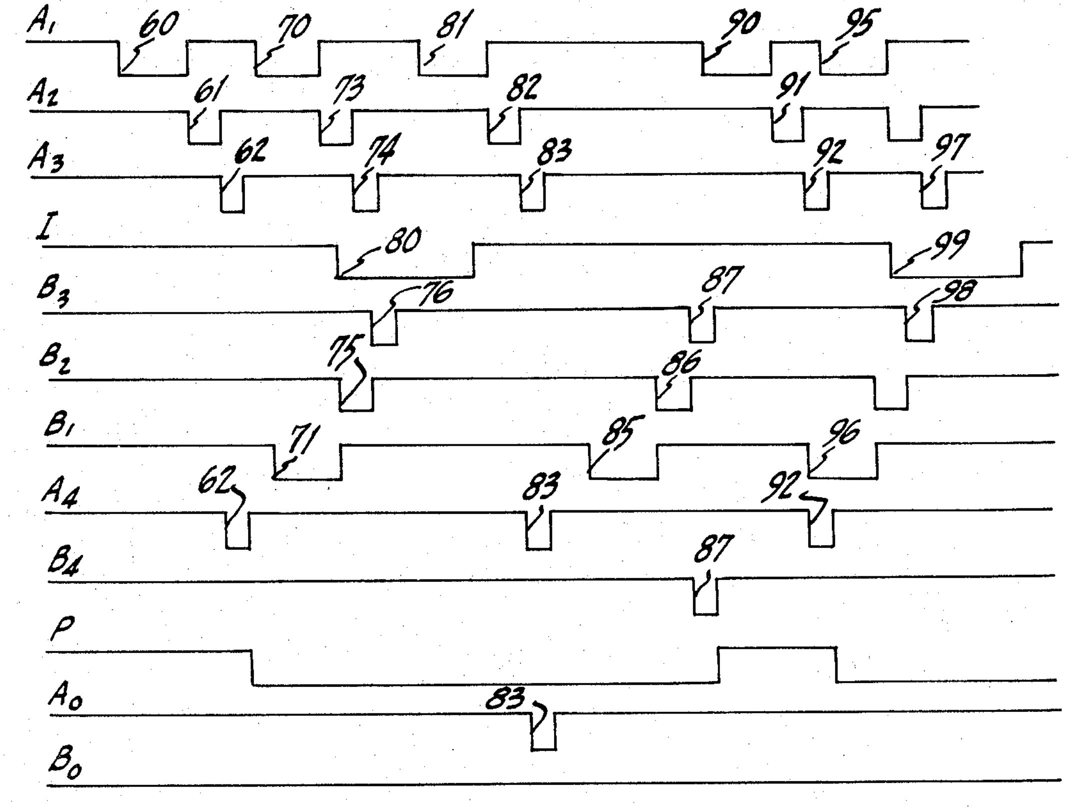
FIG. 3 is a diagram of the waveforms appearing at various points in the circuit of FIG. 2.

A more detailed description of the operation of this system will be given with reference to FIGS. 2 and 3. FIG. 2 is a circuit diagram of the pulse resolver 20 and the differential sensing circuit 23 shown in FIG. 1. The outputs of the two amplifier and pulse shaper circuits 19 and 22 are fed to two ONE-SHOT multivibrators 30 and 31 essentially identical in construction. Each of the ONE-SHOTS 30 and 31 generates a negative going pulse of approximately 50 $\mu$s. (microseconds) duration upon receiving a positive going pulse at the input. The inputs to the two ONE-SHOTS 30 and 31 are labeled $A_1$ and $B_1$ respectively. The outputs of the two ONE-SHOTS 30 and 31, labeled $A_2$ and $B_2$ respectively, are connected to a second pair of ONE-SHOTS 32 and 33 each of which generates a negative going pulse of approximately 15 $\mu$s. duration upon the occurrence of a trailing edge from the preceding ONE-SHOT 30 or 31. The outputs of the ONE-SHOTS 30 and 31 are also connected to an AND gate 34. The output of the AND gate 34 is connected to a ONE-SHOT 35 which generates a negative going pulse of approximately 100$\mu$s. duration upon the occurrence of a trailing edge from a pulse generated at the output of the AND gate 34. The output of the ONE-SHOT 35, labeled I, is directed to two INHIBIT gates 37 and 38. The INHIBIT gate 37 also receives the output from the ONE-SHOT 32 which is labeled $A_3$. The INHIBIT gate 38 receives the output of the ONE-SHOT 33 which is labeled $B_3$. The outputs of the two INHIBIT gates 37 and 38, labeled respectively $A_4$ and $B_4$, are applied to two AND gates 40 and 41 included in the differential sensing circuit 23. The two INHIBIT gates 37 and 38 are conventional in construction. When the inhibit pulse, I, is applied to the two gates no pulses from the two ONE-SHOTS 32 and 33 pass through the gates 37 and 38. The output of the INHIBIT gate 37 is supplied to the SET input (S) of a SET-RESET flip-flop 45. The SET-RESET flip-flop 45 is of conventional design. The flip-flop 45 has two inputs labeled respectively S for SET and R for RESET. It has two outputs labeled respectively 1 (ONE) and 0 (ZERO). The flip-flop 45 operates in a manner such that when a negative going pulse is applied to the SET input, the ONE output assumes a negative voltage level and the ZERO assumes a voltage level of approximately zero volts. The two outputs remain at these voltage levels until a negative going pulse appears at the RESET input in which case the ZERO output assumes a negative voltage level and the ONE output goes to approximately zero volts. The output of the INHIBIT gate 38 is connected to the RESET input of the flip-flop 45. The ONE output of the flip-flop 45 is supplied to an AND gate 40 and the ZERO output of the flip-flop 45 is directed to an input of another AND gate 41. The outputs of the two AND gates 40 and 41, labeled $A_0$ and $B_0$ respectively, form two of the output signals of the differential sensing circuit 23. The third output of the differential sensing circuit 23, labeled P, is taken from the ONE output of the flip-flop 45. The three output signals from the differential sensing circuit are applied to the digital to analogue converter 24.

A description of the operation of the circuit shown in FIG. 2 will be given with reference to the waveforms shown in FIG. 3. The labels on the various waveforms correspond to various points in the circuit of FIG. 2 as indicated by corresponding labels.

Consider first the operation of the pulse resolver circuit 20. As noted above this circuit generates output pulses corresponding to the input pulses unless there is a coincidence between two input pulses. In the case of coincidence no output pulse is generated. Therefore, if an input pulse is applied from the first amplifier and pulse shaper circuit 19 to the ONE-SHOT 30 when no pulse is applied from the second amplifier and pulse shaper circuit 22 then a corresponding output pulse will occur at the output $A_4$ of the pulse resolver circuit 20. Referring to FIG. 3 the pulse 60 on the $A_1$ waveform is such a pulse. That is, during the time when the pulse 60 occurs at $A_1$ there is no pulse occurring at $B_1$. In this case the trailing edge of the pulse 60 triggers the ONE-SHOT 30 which generates a negative going pulse 61 ($A_2$) of approximately 50 $\mu$s. duration. The trailing edge of the pulse 61 triggers the ONE-SHOT 32 and the pulse 62 ($A_3$) of approximately 15 $\mu$s. duration is generated. Since no pulse appears at the output of the ONE-SHOT 31 when the pulse 61 ($A_2$) occurs, the output of the AND gate 34 is zero and no inhibit pulse is generated by the ONE-SHOT 35. Thus, the pulse 62 from the output of the ONE-SHOT 32 passes through the INHIBIT gate 37 and appears at $A_4$. A similar operation would occur if a pulse appeared at $B_1$ when no pulse occurred at $A_1$.

Referring again to the waveform $A_1$, the pulse 70 represents a pulse which occurs in near coincidence with a pulse at the input of the ONE-SHOT 31 at $B_1$, that is a portion of the pulse 71 ($B_1$) occurs at the same time as a portion of the pulse 70 ($A_1$). The pulse 70 triggers the ONE-SHOT 30 producing the pulse 73 ($A_2$). The trailing edge of the pulse 73 triggers the ONE-SHOT 32 which generates the pulse 74 ($A_3$). Similarly, on the other side of the circuit, the trailing edge of the pulse 71 triggers the ONE-SHOT 31 generating the pulse 75 ($B_2$) and the trailing edge of the pulse 75 triggers the ONE-SHOT 33 which generates the pulse 76 ($B_3$). A portion of the pulse 75 ($B_2$) occurs during the same time as a portion of the pulse 73 ($A_2$). Both of these pulses appear at respective inputs of the AND gate 34 and thus the output of the AND gate 34 is a negative voltage during the time when both pulses 73 and 75 are present at the two inputs of the AND gate 34. The pulse appearing at the output of the AND gate 34 during the period when both pulses 73 and 75 appear at the two inputs triggers the ONE-SHOT 35 which generates the negative going inhibit pulse 80 (I) of approximately 100 $\mu$s. duration. This pulse 80 is applied to both of the INHIBIT gates 37 and 38 and acts to inhibit the pulses 74 ($A_3$) and 76 ($B_3$) from passing through the two INHIBIT gates 37 and 38. This operation occurs whenever there is a coincidence or near coincidence between the pulses supplied to the ONE-SHOTS 30 and 31. In the particular circuit described, near coincidence is defined as any overlap between the pulses appearing in the waveforms $A_2$ and $B_2$. The degree of near coincidence may be adjusted to the desired value by adjusting the duration of the output pulses generated by the two ONE-SHOTS 30 and 31.

The pulse 81 at $A_1$ represents another input pulse to the ONE-SHOT 30 which does not occur in coincidence or near coincidence with a pulse supplied to the ONE-SHOT 31. The trailing edge of the pulse 81 triggers the ONE-SHOT 30 which generates the pulse 82 ($A_2$) and the trailing edge of the pulse 82 triggers the ONE-SHOT 32 which generates the pulse 83 ($A_3$). Since there is no coincidence the pulse 83 appears at the output of the INHIBIT gate 37 as shown in the waveform $A_4$.

The pulse 85 ($B_1$) represents a pulse occurring at $B_1$ which is not in coincidence with a pulse at $A_1$. The trailing edge of the pulse 85 triggers the ONE-SHOT 31 which generates the pulse 86 ($B_2$). The trailing edge of the pulse 86 triggers the ONE-SHOT 33 which generates the pulse 87 ($B_3$). Since there was no coincidence, the pulse 87 passes through the INHIBIT gate 38 and appears at $B_4$.

The pulse 90 ($A_1$) represents another pulse supplied to the ONE-SHOT 30 which does not occur in coincidence with a pulse at $B_1$. The pulse causes the pulses 91 ($A_2$) and 92 ($A_3$) to be generated in the same manner as described above. The pulse 92 appears at $A_4$.

The pulses 95 ($A_1$) and 96 ($B_1$) are a second set of pulses which occur in near coincidence. Thus the pulses 97 ($A_3$) and 98 ($B_3$) are inhibited from passing through the two INHIBIT gates 37 and 38 by the inhibit pulse 99 appearing at I.

To briefly summarize the operation of the pulse resolver circuit 20 any pulses supplied from the two amplifiers and pulse shaper circuits 19 and 22 which do not occur in coincidence or near coincidence cause corresponding pulses to be generated at the two outputs $A_4$ and $B_4$ of the pulse resolver circuit 20. If the pulses at the two inputs $A_1$ and $B_1$, occur in coincidence or near coincidence, near coincidence being defined as an overlap of at least 50 $\mu$s., no pulses appear at the two outputs $A_4$ and $B_4$.

The two outputs $A_4$ and $B_4$ of the pulse resolver circuit 20 are supplied to the differential sensing circuit 23. The operation of the differential sensing circuit 23 will be described with respect to the waveforms of FIG. 3 labeled $A_4$ and $B_4$ which correspond to the input pulses supplied to the differential sensing circuit 23, and the waveforms labeled P, $A_0$, and $B_0$ which correspond to the three output signals generated by the differential sensing circuit 23.

The differential sensing circuit 23 acts to measure phase and frequency errors which are present in the pulse train from the amplifier and pulse shaper circuit 19. The three output signals $A_0$, $B_0$, and P are digital error signals, the $A_0$ and $B_0$ outputs indicating frequency errors and the P output indicating phase errors.

Frequency differences between the pulse trains at $A_1$ and $B_1$ are measured in the differential sensing circuit 23 by detecting the presence of two or more pulses on one of the input lines $A_4$ or $B_4$ before one pulse occurs on the other input line. If there is a frequency difference between the two pulse trains at $A_1$ and $B_1$ then the coincidence removal function performed by the pulse resolver 20 will cause the following condition to occur at $A_4$ and $B_4$. At some time there will be two or more pulses appearing at one of the points $A_4$ or $B_4$ prior to the occurrence one pulse at the other of the points $A_4$ or $B_4$. If the pulses at $A_1$ are, for example, occurring at a greater frequency than those appearing at $B_1$, then at some time two or more pulses will appear at $A_4$ prior to the one pulse occurring at $B_4$. The differential sensing circuit operates to measure this occurrence and develop error signals related thereto.

The frequency error signals developed by the differential sensing circuit 23 appear at $A_0$ and $B_0$. These signals consist of pulses supplied to the differential sensing circuit at $A_4$ or $B_4$ when the condition described above occurs. If, for example, two pulses occur at $A_4$ prior to one pulse occurring at $B_4$ then the second of the pulses at $A_4$ will appear at $A_0$ indicating a frequency error. Similarly if two input pulses occur at $B_4$ prior to one pulse at $A_4$, the second pulse at $B_4$ will appear at $B_0$.

Consider the operation of the differential sensing circuit 23 with the flip-flop 45 initially in the RESET condition. A negative voltage level appears at the ZERO output of the flip-flop 45 and an essentially zero voltage level appears at the ONE output of the flip-flop 45. This situation is shown by the waveform labeled P. Referring to the waveform labeled $A_4$ the pulse 62 appears at one input of the differential sensing circuit 23. The pulse 62 is applied both to the AND gate 40 and to the SET terminal of the flip-flop 45. Since the flip-flop 45 is in the RESET condition and a zero voltage level appears at the ONE output of the flip-flop 45, the pulse 62 does not pass through the AND gate 40 and therefore does not appear at the output of the differential sensing circuit at $A_0$. The trailing edge of the pulse 62 triggers the flip-flop 45 to change its state from RESET to SET. Thus, after the trailing edge of the pulse 62 occurs the ONE output of the flip-flop 45 assumes a negative voltage level and the ZERO output of the flip-flop 45 goes to essentially zero volts. This condition is shown by the waveform labeled P which is the ONE output of the flip-flop 45. The next pulse supplied to the differential sensing circuit 23 is the pulse 83 ($A_4$). When the pulse 83 appears at the input of the AND gate 40 the second input to the AND gate 40 is at a negative voltage level due to the SET state of the flip-flop 45. Since both inputs to the AND gate 40 are negative voltages, the pulse 83 passes through the AND gate 40 and appears at $A_0$. A similar action would take place if two pulses appeared at the other input $B_4$ of the differential sensing circuit 23 prior to one pulse occurring at the $A_4$ input.

Referring again to the waveforms the next pulse applied to the differential sensing circuit 23 is the pulse 87 appearing at $B_4$. Since the flip-flop 45 is in the SET condition and the ZERO output of the flip-flop 45 is at essentially zero volts the pulse 87 does not pass through the AND gate 41. The trailing edge of the pulse 87 changes the state of the flip-flop 45 and places it in the RESET condition. Thus, if the next pulse occurred at $B_4$ the pulse would pass through the AND gate 41. In the example illustrated however, the next pulse 92 appears at $A_4$ and the state of the flip-flop 45 is again changed by the trailing edge of the pulse 92.

The outputs labeled $A_0$ and $B_0$ of the differential sensing circuit 23 act to supply frequency error information to the digital-to-analogue converter 24. If the frequency of the pulses appearing at the $A_1$ input is the same as the frequency of pulses appearing at the $B_1$ input then no pulses will be generated at the outputs labeled $A_0$ and $B_0$ because if the two input pulse trains at $A_1$ and $B_1$ occur at the same frequency then two pulses will never occur at one of the points $A_4$ or $B_4$ before one pulse occurs at the other of the points $A_4$ or $B_4$. If however, the frequency of the pulses at $A_1$ is greater than the frequency of the pulses at $B_1$ then eventually two pulses will occur at $A_4$ prior to one pulse occurring at $B_4$. The number of pulses occurring during any particular period of time at the output $A_0$ will indicate the magnitude of the frequency error. The direction or sense of the frequency error is indicated by observing on which line $A_0$ or $B_0$ the output pulses occur. If the output pulses occur on the $A_0$ line then the frequency of the input at $A_1$ is greater than the frequency of the pulses at $B_1$. If the output pulses occur at $B_0$ then the frequency of the pulses occurring at $B_1$ is greater than the frequency of the pulses occurring at $A_1$.

The third output of the differential sensing circuit 23, which is labeled P, supplies phase error information. If the signals from the two transducers 18 and 21 are of the same frequency and phase there will be no output from the differential sensing circuit 23 because the coincidence detected by circuitry of the pulse resolver circuit 20 will not pass any pulses. Assuming however that the signals supplied to the pulse resolver 20 are of the same frequency but are out of phase then pulses will be supplied to the differential sensing circuit 23. None of these pulses however will appear at the outputs $A_0$ and $B_0$ since the frequencies of the pulses are the same. These pulses will alternately change the state of the flip-flop 45 from SET to RESET and thus cause a pulse train at the P output of the differential sensing circuit 23. The normal state of the flip-flop 45 is the RESET state. Thus the pulse train generated at P when a phase error occurs is a series of negative going pulses. These pulses are integrated in the digital to analogue converter 24 to provide an analogue voltage proportional to the phase error.

The three outputs $A_0$, $B_0$, and P of the differential sensing circuit 23 are supplied to the digital-to-analogue converter which converts these three digital error signals to an analogue signal which controls the voltage controlled oscillator. The digital to analogue converter 24 has a storage capability which is greater than the maximum error expected.

Figure 4:
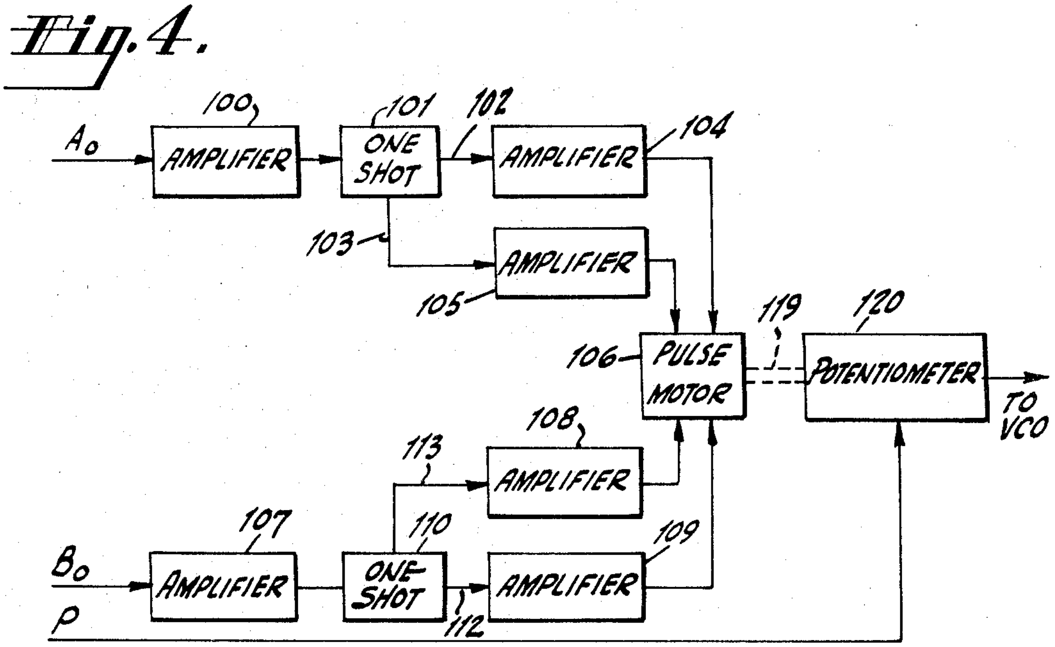
FIG. 4 is a block diagram of one of the elements of the embodiment of FIG. 1.

FIG. 4 is a block diagram of a typical analogue to digital converter which might be used in the present system. The output signal $A_0$ from the differential sensing circuit 23 is supplied to a first amplifier 100 which amplifies the pulses. The output of the amplifier 100 is supplied to a ONE-SHOT multivibrator 101 which generates two output signals labeled 102 and 103 respectively. In the operation of the ONE-SHOT 101, the leading edge of a pulse from the amplifier 100 triggers the ONE-SHOT 101 to produce a positive going pulse at one output 102 and a negative going pulse which is delayed a predetermined time with respect to the pulse at the first output 102 at the other output 103. The pulses at the output of the ONE-SHOT 101 are amplified by conventional driver amplifiers 104 and 105, the outputs of which are connected to a pulse motor 106. The circuit for supplying the information from the $B_0$ input to the pulse motor 106 is essentially the same as the circuitry for supplying the $A_0$ input to the pulse motor 106. This circuitry includes the amplifiers 107, 108, and 109 and the ONE-SHOT multivibrator 110. The pulse motor 106 is a conventional pulse motor where the shaft position is determined by the pulses supplied to the motor. Generally such pulse motors require alternating polarity pulses to increase the shaft position. Thus, each side of the pulse motor 106 includes two inputs one supplying a positive going pulse and the other supplying a negative going pulse. Considering the side of the pulse motor 106 which corresponds to the $A_0$ input, if any pulse occurs at $A_0$ then a positive pulse will occur at the output of the amplifier 104 to advance the motor one step and subsequently a negative pulse will appear at the output of the amplifier 105 to advance the pulse motor 106 another step. Thus for each pulse input at $A_0$ the pulse motor 106 is changed by two steps. The operation of the pulse motor 106 for pulses supplied to the $B_0$ input is essentially the same as that for pulses supplied to the $A_0$ input. However, pulses from the $B_0$ input change the shaft position of the motor 106 in the opposite direction as pulses from the $A_0$ input.

A potentiometer 120 is connected to the shaft 119 of the pulse motor 106 in a conventional manner. The position of the shaft 119 controls a wiper arm in the potentiometer 120 and therefore the output of the potentiometer 120 corresponds to the shaft position. The potentiometer 120 serves as a storage element for the shaft position. The potentiometer 120 will generally be capable of storing a plurality of turns of the shaft 119. For example the potentiometer 120 may be capable of storing five turns in either direction of the shaft 119 where five turns of the shaft 119 may correspond to one hundred frames of motion picture film. The maximum storage capacity of the potentiometer 119 should exceed the maximum error expected. The P output from the differential sensing circuit 22 is combined in the total output signal.

Figure 5:
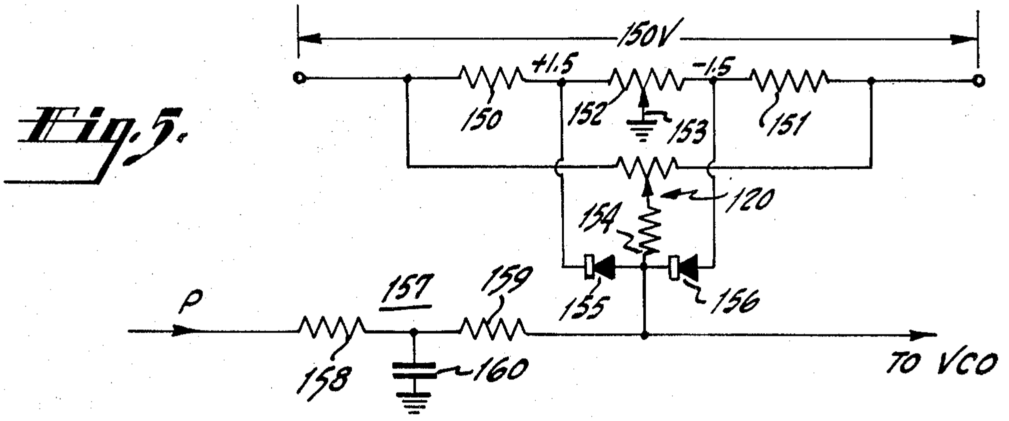
FIG. 5 is a circuit diagram of a portion of the element of FIG. 4.

FIG. 5 is a circuit diagram of a typical construction which might be used for the potentiometer 120 of FIG. 4. This circuit results in the control characteristic of FIG. 6. A source of 150 volts is applied to two resistors 150 and 151. Each of these two resistors is connected to a respective end of a zeroing potentiometer 152. The values of the resistors 150 and 151 and the value of the resistance of the potentiometer 152 are chosen to produce 1.5 volts across the ends of the potentiometer 152. The arm 153 of the potentiometer 152 is set to give a positive 1.5 volts on one side of the potentiometer 152 and a negative 1.5 volts on the other side of the potentiometer 152. The ends of the potentiometer 120, which is the potentiometer connected to the shaft 119, are connected to the 150 volt source. The end of the wiper arm 154 of the potentiometer 120 is connected through a first diode 155 to the positive end of the potentiometer 152 and through a second diode 156 to the negative end of the potentiometer 152. The diodes are employed to maintain the maximum voltage deviation at the end of the arm 154 at plus or minus 1.5 volts. The voltage at the end of the arm 154 will thus vary according to shaft position between plus and minus 1.5 volts.

The P output voltage from the differential sensing circuit 23 is applied to a conventional integrating network 157 comprising two resistors 158 and 159 and a capacitor 160. The output of the integrating network 157 is connected to the end of the arm 154. The end of the arm 154 forms the control voltage which is applied to the voltage controlled oscillator 25 of FIG. 1.

Figure 6:
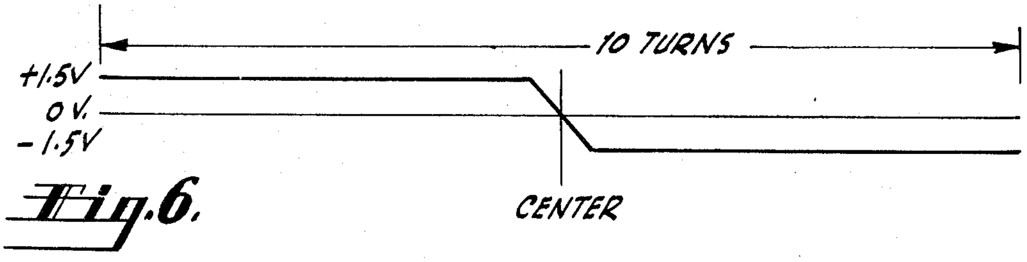
FIG. 6 is a diagram of the control characteristic of the circuit of FIG. 5.

The characteristics of the frequency control voltage developed by the circuit of FIG. 5 are shown in FIG. 6. This figure shows the voltage at the output of the potentiometer 120, i.e. at the end of the arm 154, for ten turns of the shaft 119. The voltage varies linearly for small deviations about the center. For larger deviations about the center, the control voltage remains constant at plus or minus 1.5 volts. The characteristic of FIG. 6 does not include the phase error voltage supplied from the integrating network 157. The phase error voltage from the integrating network 157 is added to the frequency error voltage from the potentiometer 120 by the circuit construction shown.

Consider the following example of the present invention's operation. Assume that during recording, both the camera and the tape recorder were driven at constant speeds. In this case the reference signal recorded on the tape will be of constant frequency. Assume further that during reproduction when both the motion picture projector and the tape reproducing system are started, the motor driving the motion picture projector comes up to normal speed before the motor driving the tape reproducing system and that when the tape motor finally reaches normal speed the film has advanced beyond its proper synchronous position. In this case the amplifier and pulse shaper circuit 19 (FIG. 1) will generate more pulses than the amplifier and pulse shaper circuit 22. Therefore a number of pulses will pass through the differential sensing circuit 23 and appear in waveform at $A_0$ (FIG. 2). The digital to analogue converter 24 will generate an error signal corresponding to the number of pulses and the frequency of the voltage controlled oscillator 25 will decrease causing the motor 10 driving the projector to slow down until an equal number of pulses appear in the waveform at the other output $B_0$ of the differential sensing circuit 23. When an equal number of pulses appear at $B_0$ as appear at $A_0$ the phase error signal P will control the speed of the motor 10 to ensure and maintain proper phase synchronization.

What is claimed is:

1. A system for controlling the operation of a device having periodic characteristics, said system comprising:
(a) means for generating a first train of pulses having frequency and phase characteristics corresponding to desired frequency and phase characteristics of said device,
(b) means for generating a second train of pulses having frequency and phase characteristics corresponding to the actual frequency and phase characteristics of said device,
(c) means responsive to both of said pulse trains for detecting any coincidence between the pulses of said pulse trains and for generating only when no coincidence occurs, third and fourth pulse trains having frequency and phase characteristics corresponding respectively to the frequency and phase characteristics of said first pulse train and said second pulse train,
(d) means responsive to said third and fourth pulse trains for detecting phase and frequency differences between said third and fourth pulse trains and for generating error signals corresponding to said phase and frequency differences, and
(e) means responsive to said error signals for changing the periodic characteristics of said device to minimize said error signals.

2. A system for controlling the operation of a device having periodic characteristics said system comprising:
(a) means for generating a first train of pulses having frequency and phase characteristics corresponding to desired frequency and phase characteristics of said device,
(b) means for generating a second train of pulses having frequency and phase characteristics corresponding to the actual frequency and phase characteristics of said device,
(c) means responsive to both of said pulse trains for detecting coincidence within predetermined limits between the pulses of said pulse trains and for generating third and fourth pulse trains having frequency and phase characteristics corresponding respectively to the frequency and phase characteristics of said first and second pulse trains except when said coincidence occurs,
(d) means responsive to said third and fourth pulse trains for detecting the occurrence of two or more pulses in either one of said third and fourth pulse trains before the occurrence of the next pulse in the other one of said third and fourth pulse trains and for generating error signals corresponding to said detection, and
(e) means responsive to said error signals for changing the periodic characteristics of said device to minimize said error signals.

3. A system for controlling the operation of a device having periodic characteristics, said system comprising:
(a) means for generating a first train of pulses having frequency and phase characteristics corresponding to desired frequency and phase characteristics of said device,
(b) means for generating a second train of pulses having frequency and phase characteristics corresponding to the actual frequency and phase characteristics of said device,
(c) means responsive to both of said pulse trains for detecting any coincidence within set limits between the pulses of said pulse trains and for generating third and fourth pulse trains having frequency and phase characteristics corresponding respectively to the frequency and phase characteristics of said first and second pulse trains except when said coincidence occurs,
(d) memory means responsive to said third and fourth pulse trains and having first and second states, said memory means being placed in said first state upon the occurrence of a pulse in said third pulse train and being placed in said second state upon the occurrence of a pulse in said fourth pulse train,
(e) first gate means responsive to the states of said memory means and to said third pulse train for passing the pulses of said third pulse train only when said memory means is in its first state,
(f) second gate means responsive to the states of said memory means and to said fourth pulse train from passing the pulses of said fourth pulse train only when said memory means is in its second state, and
(g) means responsive to the pulses passed by said first and second gate means and to the state of said memory means for changing the periodic characteristics of said device to reduce the number of pulses passing through said first and second gate means and the frequency with which the state of said memory means is changed.

4. A system for controlling the operation of a device having periodic characteristics, said system comprising:
(a) means for generating a reference train of pulses having frequency and phase characteristics corresponding to desired frequency and phase characteristics of said device,
(b) means for generating a second train of pulses having frequency and phase characteristics corresponding to the actual frequency and phase characteristics of said device,
(c) first pulse generating means responsive to said reference pulse train for generating a pulse upon the occurrence of the lagging edge of each of the pulses of said reference pulse train,
(d) second pulse generating means responsive to the pulses generated by said first pulse generating means for generating a pulse upon the occurrence of the lagging edge of each of said pulses generated by said first pulse generating means,
(e) third pulse generating means responsive to said second pulse train for generating a pulse upon the occurrence of the lagging edge of each of the pulses of said second pulse train,
(f) fourth pulse generating means responsive to the pulses generated by said third pulse generating means for generating a pulse upon the occurrence of the lagging edge of each of said pulses generated by said third pulse generating means,
(g) a first gate means having two inputs and an output and arranged to produce an output pulse only when pulses occur in coincidence within set limits at both said inputs of said gate means, one input of said first gate means being connected to the output of said first pulse generating means and the second input of said first gate means being connected to the output of said third pulse generating means, (h) fifth pulse generating means responsive to the output of said first gate means for generating a pulse upon the occurrence of an output pulse at said first gate means, (i) second gate means having first and second inputs and an output and arranged to produce an output pulse corresponding to the pulse appearing at its first input only when no pulse is applied to the second input of said second gate means, (j) third gate means having first and second inputs and an output and arranged to produce an output pulse corresponding to the pulse appearing at its first input only when no pulse is applied to the second input of said third gate means, (k) means for connecting the output of said second pulse generating means to the first input of said second gate means and for connecting the output of said fourth pulse generating means to the first input of said third gate means, (l) means for connecting the output of said fifth pulse generating means to the second inputs of both of said second and third gate means, the output of said second gate means forming a third pulse train and the output of said third gate means forming a fourth pulse train, (m) memory means having first and second states and arranged to be placed in said first state upon the occurrence of a pulse in said third pulse train and in said second state upon the occurrence of a pulse in said fourth pulse train, (n) fourth gate means responsive to the state of said memory means and to said third pulse train for passing the pulses of said third pulse train only when said memory means is in its first state, (o) fifth gate means responsive to the state of said memory means and to said fourth pulse train for passing the pulses of said fourth pulse train only when said memory means is in its second state, and (p) means responsive to the pulses passed by said fourth and fifth gate means and to the state of said memory means for changing the periodic characteristics of said device to reduce the number of pulses passing through said fourth and fifth gate means and the frequency with which the state of said memory means is changed.

5. A system for detecting frequency differences between first and second pulse trains, said system comprising:

(a) means responsive to both of said pulse trains for detecting any coincidence within given limits between the pulses of said pulse trains and for generating only when no coincidence occurs, third and fourth pulse trains having frequency and phase characteristics corresponding respectively to the frequency and phase characteristics of said first and second pulse trains, (b) means responsive to said third and fourth pulse trains for detecting phase and frequency differences between said third and fourth pulse trains and for generating signals corresponding to said phase and frequency differences.

6. A system for detecting frequency differences between first and second pulse trains, said system comprising:

(a) means responsive to both of said pulse trains for detecting coincidence between the pulses of said pulse trains and for generating third and fourth pulse trains having frequency and phase characteristics corresponding respectively to the frequency and phase characteristics of said first and second pulse trains except when said coincidence occurs, (b) means responsive to said third and fourth pulse trains for detecting the occurrence of two or more pulses in either of said third and fourth pulse trains before the occurrence of the next pulse in the other of said third and fourth pulse trains, for detecting phase differences between said third and fourth pulse trains, and for generating signals corresponding to said detections.

7. A system for detecting frequency and phase differences between first and second pulse trains, said system comprising:

(a) means responsive to both of said pulse trains for detecting coincidence or near coincidence between the pulses of said pulse trains and for generating third and fourth pulse trains having frequency and phase characteristics corresponding respectively to the frequency and phase characteristics of said first and second pulse trains, said third and fourth pulse trains being generated only when no coincidence or near coincidence occurs, (b) circuit means responsive to said third and fourth pulse trains and having first and second states, said circuit means being placed in said first state upon the occurrence of a pulse in said third pulse train and in said second state upon the occurrence of a pulse in said fourth pulse train, (c) first gate means responsive to the state of said circuit means and to said third pulse train for passing the pulses of said third pulse train only when said circuit means is in its first state, (d) second gate means responsive to the state of said circuit means and to said fourth pulse train for passing the pulses of said fourth pulse train only when said circuit means is in its second state.

8. A system for detecting frequency and phase differences between first and second pulse trains containing such differences, said system comprising:

(a) circuit means responsive to said first and second pulse trains and having first and second states, said circuit means being placed in said first state upon the occurrence of a pulse in said first pulse train and in said second state upon the occurrence of a pulse in said second pulse train, (b) first gate means responsive to the state of said circuit means and to said first pulse train for passing the pulses of said first pulse train only when said circuit means is in its first state, (c) second gate means responsive to the state of said circuit means and to said second pulse train for passing the pulses of said second pulse train only when said circuit means is in its second state, and (d) means responsive to the output pulses from said first and second gate means and to the state of said circuit means to produce error signals indicative of said frequency and phase differences.

9. A system for synchronizing the operation of a motion picture projection system with a magnetic tape recording which contains the sound information to accompany the picture, said magnetic tape recording including, in addition to the sound recording, a reference signal recording with frequency and phase characteristics corresponding to the speed and position characteristics of the motion of the film during recording of said picture, said system comprising:

(a) means responsive to said reproduced reference signal for generating a reference pulse train having frequency and phase characteristics corresponding to the frequency and phase characteristics of said reference signal, (b) means for generating a second train of pulses having frequency and phase characteristics corresponding to the actual motion of said film during reproduction, (c) means responsive to both of said pulse trains for detecting any coincidence within given limits between the pulses of said pulse trains and for generating except when said coincidence occurs, third and fourth pulse trains having frequency and phase characteristics corresponding respectively to the frequency and phase characteristics of said reference pulse train and said second pulse train, (d) means responsive to said third and fourth pulse trains for detecting phase and frequency differences between said third and fourth pulse trains and for generating error signals corresponding to said phase and frequency differences, and (e) means responsive to said error signals for changing the motion of said film in said projection system to minimize said error signals.

10. A system for synchronizing the operation of a motion picture projection system with a magnetic tape recording which contains the sound information to accompany the picture, said magnetic tape recording including in addition to the sound recording, a reference signal recorded with frequency and phase characteristics corresponding to the speed and position characteristics of the motion of the film during recording of said picture, said system comprising:

(a) means responsive to said reproduced reference signal for generating a reference pulse train having frequency and phase characteristics corresponding to the frequency and phase characteristics of said reference signal, (b) means for generating a second train of pulses having frequency and phase characteristics corresponding to the actual motion of said film during reproduction, (c) means responsive to both of said pulse trains for detecting coincidence within predetermined limits between the pulses of said pulse trains and for generating third and fourth pulse trains having frequency and phase characteristics corresponding respectively to the frequency and phase characteristics of said reference pulse train and said second pulse train, said third and fourth pulse trains being generated except when said coincidence occurs, (d) means responsive to said third and fourth pulse trains for detecting the occurrence of two or more pulses in either of said third and fourth pulse trains before the occurrence of the next pulse in the other of said third and fourth pulse trains, for detecting phase differences between said third and fourth pulse trains, and for generating error signals corresponding to said detections, and (e) means responsive to said error signals for changing the motion of said film in said projection system to minimize said error signals.

11. A system for synchronizing the operation of a motion picture projection system with a magnetic tape recording which contains the sound information to accompany the picture, said magnetic tape recording including in addition to the sound recording a reference signal recorded with frequency and phase characteristics corresponding to the speed and position characteristics of the motion of the film during recording of said picture, said system comprising:

(a) means responsive to said reproduced reference signal for generating a reference pulse train having frequency and phase characteristics corresponding to the frequency and phase characteristics of said reference signal, (b) means for generating a second train of pulses having frequency and phase characteristics corresponding to the actual motion of said film during reproduction, (c) means responsive to both of said pulse trains for detecting coincidence between the pulses of said pulse trains and for generating except when said coincidence occurs, third and fourth pulse trains having frequency and phase characteristics corresponding respectively to the frequency and phase characteristics of said reference pulse train and said second pulse train, (d) memory means responsive to said third and fourth pulse trains having first and second states and arranged to be placed in said first state upon the occurrence of a pulse in said third pulse train in said second state upon the occurrence of a pulse in said said fourth pulse train, (e) first gate means responsive to the state of said memory means and to said third pulse train for passing the pulses of said third pulse train only when said memory means is in its first state, (f) second gate means responsive to the state of said memory means and to said fourth pulse train for passing the pulses of said fourth pulse train only when said memory means is in its second state, and (g) means responsive to the pulses passed by said first and second gate means and to the state of said memory means for changing the motion of said film in said projection system to reduce the number of pulses passing through said first and second gate means and the frequency with which the state of said memory means is changed.

12. A system for synchronizing the operation of a motion picture projection system with a magnetic tape recording which contains the sound information to accompany the picture, said magnetic tape recording including in addition to the sound recording a reference signal recorded with frequency and phase characteristics corresponding to the speed and position characteristics of the motion of the film during recording of said picture, said system comprising:

(a) means responsive to said reproduced reference signal for generating a reference pulse train having frequency and phase characteristics corresponding to the frequency and phase characteristics of said reference signal, (b) means for generating a second train of pulses having frequency and phase characteristics corresponding to the actual motion of said film during reproduction, (c) first pulse generating means responsive to said reference pulse train for generating a pulse upon the occurrence of the lagging edge of each of the pulses of said reference pulse train, (d) second pulse generating means responsive to the pulses generated by said first pulse generating means for generating a pulse upon the occurrence of the lagging edge of each of said pulses generated by said first pulse generating means, (e) third pulse generating means responsive to said second pulse train for generating a pulse upon the occurrence of the lagging edge of each of the pulses of said second pulse train, (f) fourth pulse generating means responsive to the pulses generated by said third pulse generating means for generating a pulse upon the occurrence of the lagging edge of each of said pulses generated by said third pulse generating means, (g) a first gate means having two inputs and an output and arranged to produce an output pulse only when input pulses are supplied in coincidence or near coincidence to both of the inputs of said gate means, one input of said first gate means being connected to the output of said first pulse generating means and the second input of said first gate means being connected to the output of said third pulse generating means, (h) fifth pulse generating means responsive to the output of said first gate means for generating a pulse upon the occurrence of an output pulse at said first gate means, (i) second gate means having two inputs and an output and arranged to produce output pulses corresponding to the pulses appearing at its first input only when no pulse is applied to said second input of said second gate means, (j) third gate means having two inputs and an output and arranged to produce output pulses corresponding to the pulses appearing at its first input only when no input pulse is applied to said second input of said third gate means, (k) means for connecting the output of said second pulse generating means to the first input of said second gate means and for connecting the output of said fourth pulse generating means to the first input of said third gate means, (l) means for connecting the output of said fifth pulse generating means to the second inputs of both of said third and fourth gate means, the output of said second gate means forming a third pulse train and the output of said third gate means forming a fourth pulse train, (m) memory means responsive to said third and fourth pulse trains having first and second states and arranged to be placed in said first state upon the occurrence of a pulse in said third pulse train and in said second state upon the occurrence of a pulse in said fourth pulse train, (n) fourth gate means responsive to the state of said memory means and to said third pulse train for passing the pulses of said third pulse train only when said memory means is in its first state, (o) fifth gate means responsive to the state of said memory means and to said fourth pulse train for passing the pulses of said fourth pulse train only when said memory means is in its second state, (p) means responsive to the pulses passed by said fourth and fifth gate means and to the state of said memory means for changing the motion of said film in said projection system to reduce the number of pulses passing through said fourth and fifth gate means and the frequency with which the state of said memory means is changed.

References Cited

UNITED STATES PATENTS

| | | | |
|---|---|---|---|
| 3,058,063 | 10/1962 | Sher | 328—134 X |
| 3,164,777 | 1/1965 | Guanella | 328—134 |
| 3,227,863 | 1/1966 | Winsor | 328—134 X |
| 3,235,800 | 2/1966 | Turrell | 328—134 X |
| 3,271,675 | 9/1966 | Kreinberg. | |
| 3,312,780 | 4/1967 | Hurst et al. | |
| 3,324,399 | 6/1967 | Hall. | |

ALFRED L. BRODY, *Primary Examiner.*

U.S. Cl. X.R.

178—6.7; 179—100.2; 307—269; 328—134, 155; 329—110; 350—117, 120; 352—50